(12) United States Patent
Zhang et al.

(10) Patent No.: US 7,202,792 B2
(45) Date of Patent: Apr. 10, 2007

(54) DROWSINESS DETECTION SYSTEM AND METHOD

(75) Inventors: Harry Zhang, Carmel, IN (US); Gerald J. Witt, Carmel, IN (US); Matthew R. Smith, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 242 days.

(21) Appl. No.: 10/291,913

(22) Filed: Nov. 11, 2002

(65) Prior Publication Data

US 2004/0090334 A1 May 13, 2004

(51) Int. Cl.
*G08B 23/00* (2006.01)

(52) U.S. Cl. .................. 340/575; 340/576; 340/436; 340/439; 340/573.7; 340/937

(58) Field of Classification Search ............... 340/575, 340/576, 573.1, 573.4, 691, 693, 436, 439, 340/937, 573.7; 382/117, 118, 203, 789, 382/103, 104; 351/206, 209, 246, 211, 221; 701/1, 10, 45, 70; 180/272, 273, 271; 348/77, 348/143, 148, 151
See application file for complete search history.

(56) References Cited

U.S. PATENT DOCUMENTS

| | | | |
|---|---|---|---|
| 4,397,531 A | | 8/1983 Lees | ........................... 351/210 |
| 4,928,090 A | * | 5/1990 Yoshimi et al. | ............. 340/575 |
| 5,689,241 A | * | 11/1997 Clarke et al. | ................ 340/575 |
| 5,786,765 A | * | 7/1998 Kumakura et al. | ......... 340/576 |
| 5,878,156 A | * | 3/1999 Okumura | ..................... 382/118 |
| 6,304,187 B1 | * | 10/2001 Pirim | ......................... 340/576 |
| 2004/0070509 A1 | * | 4/2004 Grace et al. | |

FOREIGN PATENT DOCUMENTS

| | | |
|---|---|---|
| DE | 101 03 401 A1 | 8/2002 |
| EP | 0 713 675 A | 5/1996 |
| JP | 07156682 | 6/1995 |

OTHER PUBLICATIONS

"Research on Vehicle-Based Driver Status/Performance Monitoring; Development, Validation, and Refinement of Algorithms for Detection of Driver Drowsiness," U.S. Department of Transportation, National Highway Traffic Safety Administration, Dec. 1994.
Ueno H et al: "Development of drowsiness detection system" Vehicle Navigation and Information Systems Conference 1994 pp. 15-20.

* cited by examiner

*Primary Examiner*—Hung Nguyen
(74) *Attorney, Agent, or Firm*—Jimmy L. Funke

(57) ABSTRACT

A low-cost system for detecting a drowsy condition of a driver of a vehicle includes a video imaging camera located in the vehicle and oriented to generate images of a driver of the vehicle. The system also includes a processor for processing the images acquired by the video imaging camera. The processor monitors an eye and determines whether the eye is in an open position or a closed state. The processor further determines a time proportion of eye closure as the proportion of a time interval that the eye is in the closed position, and determines a driver drowsiness condition when the time proportion of eye closure exceeds a threshold value.

20 Claims, 4 Drawing Sheets

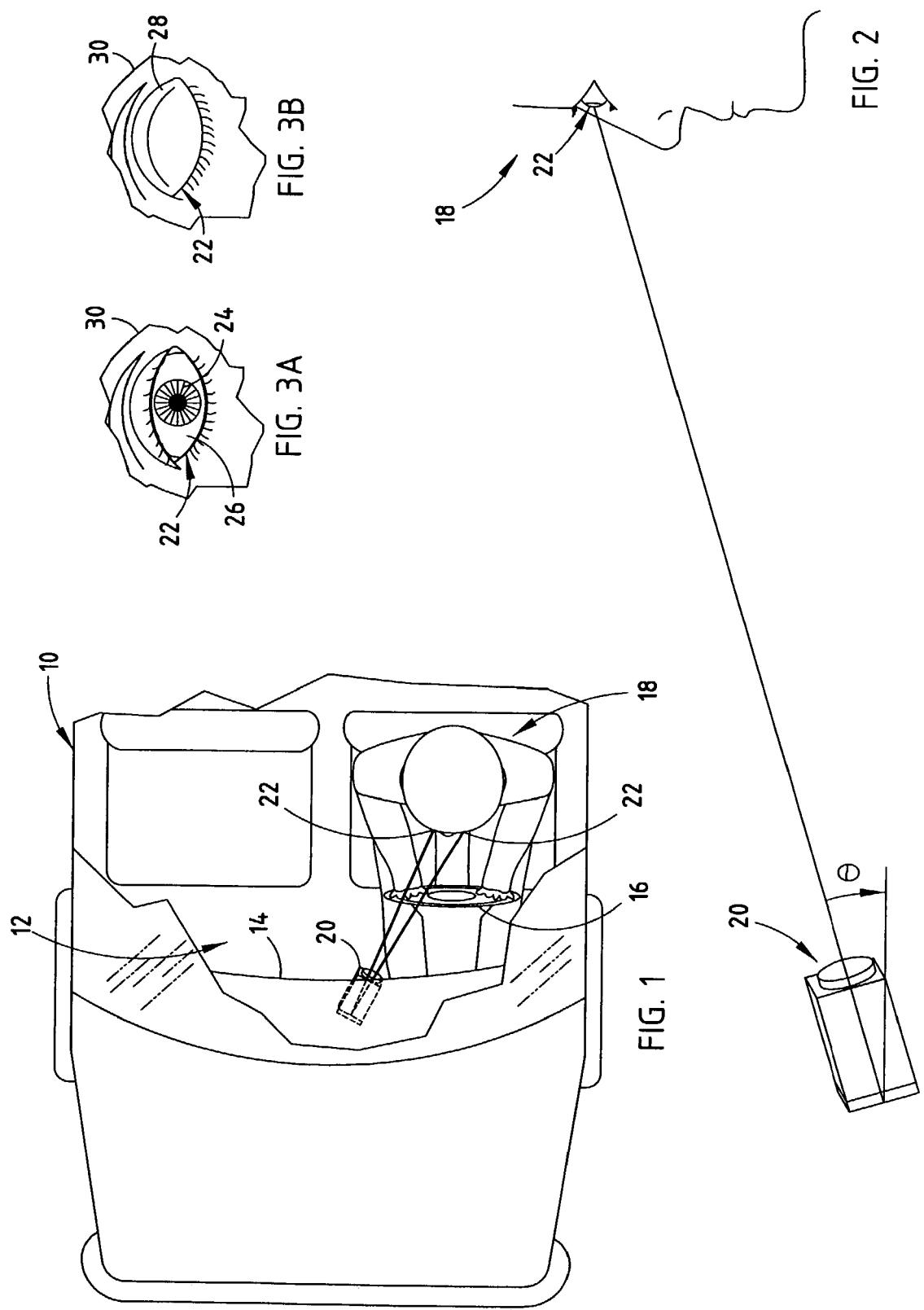

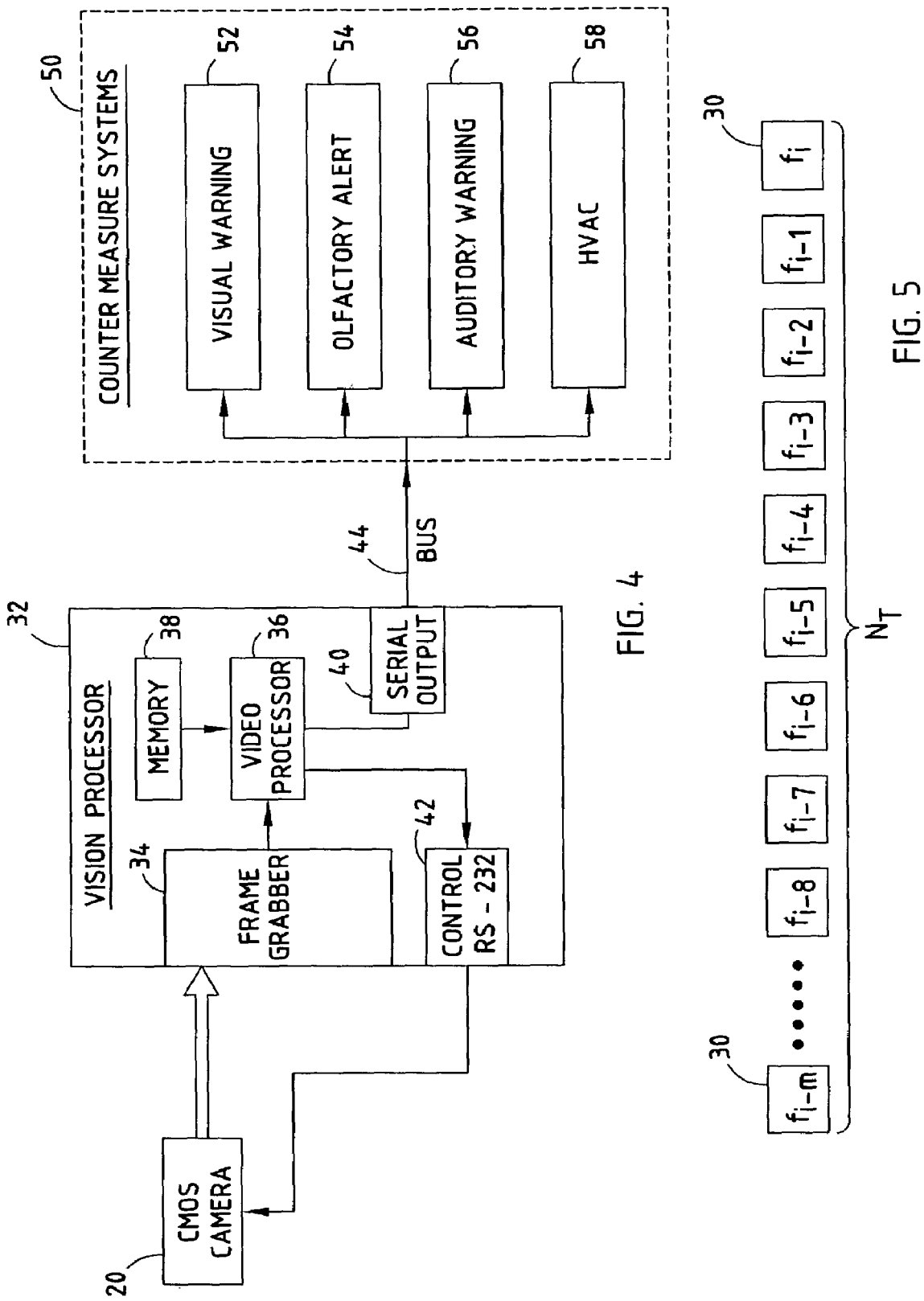

DROWSINESS DETECTION SYSTEM AND METHOD

TECHNICAL FIELD

The present invention generally relates to eye monitoring and, more particularly, relates to detecting a drowsiness condition of a person, particularly a driver of a vehicle, by monitoring one or both eyes with a video imaging system.

BACKGROUND OF THE INVENTION

Video imaging systems have been proposed for use in vehicles to monitor the driver and/or passengers in the vehicle. Some proposed imaging systems include one or two cameras focused on the driver of the vehicle to capture images of the driver's face and allow for determination of various facial characteristics of the driver including the position, orientation, and movement of the driver's eyes, face, and head. By knowing the driver facial characteristics, such as the driver's eye position and gaze, ocular data, head position, and other characteristics, vehicle control systems can provide enhanced vehicle functions. For example, a vehicle control system can monitor the eye of the driver and determine a condition in which the driver appears to be drowsy, and can take further action to alert the driver of the driver drowsy condition.

Many vehicle accidents are caused by the driver of the vehicle becoming drowsy and then falling asleep. In many driving situations, drivers are not even aware of their sleepiness or drowsiness prior to actually falling asleep. It has been proposed to monitor the facial characteristics of the vehicle driver, to anticipate when the driver is becoming drowsy, and to alert the driver before the driver falls asleep. One proposed technique employs video cameras focused on the driver's face for monitoring the eye of the driver. A vehicle mounted camera arrangement is disclosed in U.S. patent application Ser. No. 10/103,202, entitled "VEHICLE INSTRUMENT CLUSTER HAVING INTEGRATED IMAGING SYSTEM," filed on Mar. 21, 2002, and commonly assigned to the Assignee of the present application The aforementioned vehicle camera arrangement includes a pair of video imaging cameras mounted in the instrument panel of the vehicle and focused on the facial characteristics, including the eyes, of the driver of the vehicle.

Prior known driver drowsiness detection techniques have proposed processing the video images from the cameras to determine a precise measurement of the percent of closure of both eyes of the driver. The percent of eye closure is then used to determine if the driver has become drowsy. For example, such approaches may monitor the eyelid position of each eye and determine a driver drowsiness condition based when the eyes of the driver are greater than or equal to eighty percent (80%) closure. While the aforementioned proposed technique is able to use the percent of closure of the eye of the driver as an indicator of driver drowsiness, such a technique is generally costly. Accordingly, it is therefore desirable to provide for an alternative low-cost driver drowsiness detection system for detecting a driver drowsy condition, particularly for use in a vehicle.

SUMMARY OF THE INVENTION

The present invention provides for a low-cost system for detecting a drowsy condition by monitoring a person's eye. The system includes a video imaging camera oriented to generate images of a person, including an eye. The system also includes a processor for processing the images generated by the video imaging camera. The processor monitors the acquired image and determines whether the eye is in one of an open position and a closed position. The processor further determines a time proportion of eye closure as the proportion of a time interval that the eye is in the closed position, and determines a drowsiness condition when the time proportion exceeds a threshold value.

According to one aspect of the present invention, the camera is located in a vehicle for monitoring the eye of the driver of the vehicle, and the system determines a driver drowsy condition. According to a further aspect of the present invention, the processor may further output a signal indicative of the determined driver drowsiness condition so as to initiate a countermeasure, such as provide a visual or audible alarm or to adjust temperature in the vehicle so as to mitigate the driver drowsy condition.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which:

FIG. 1 is a top view of a video imaging camera located in the cockpit of a vehicle and projecting towards the face of a driver;

FIG. 2 is a side perspective view of the projection of the video imaging camera towards the face of the driver;

FIGS. 3A and 3B are sectional views of a video image showing the eye in an open position and a closed position, respectively;

FIG. 4 is a block diagram further illustrating the driver drowsy detection system with countermeasure systems;

FIG. 5 illustrates a series of video imaging frames processed within a time interval for determining the time proportion of eye closure.

DESCRIPTION OF THE PREFERRED EMBODIMENT

Figure 6A:
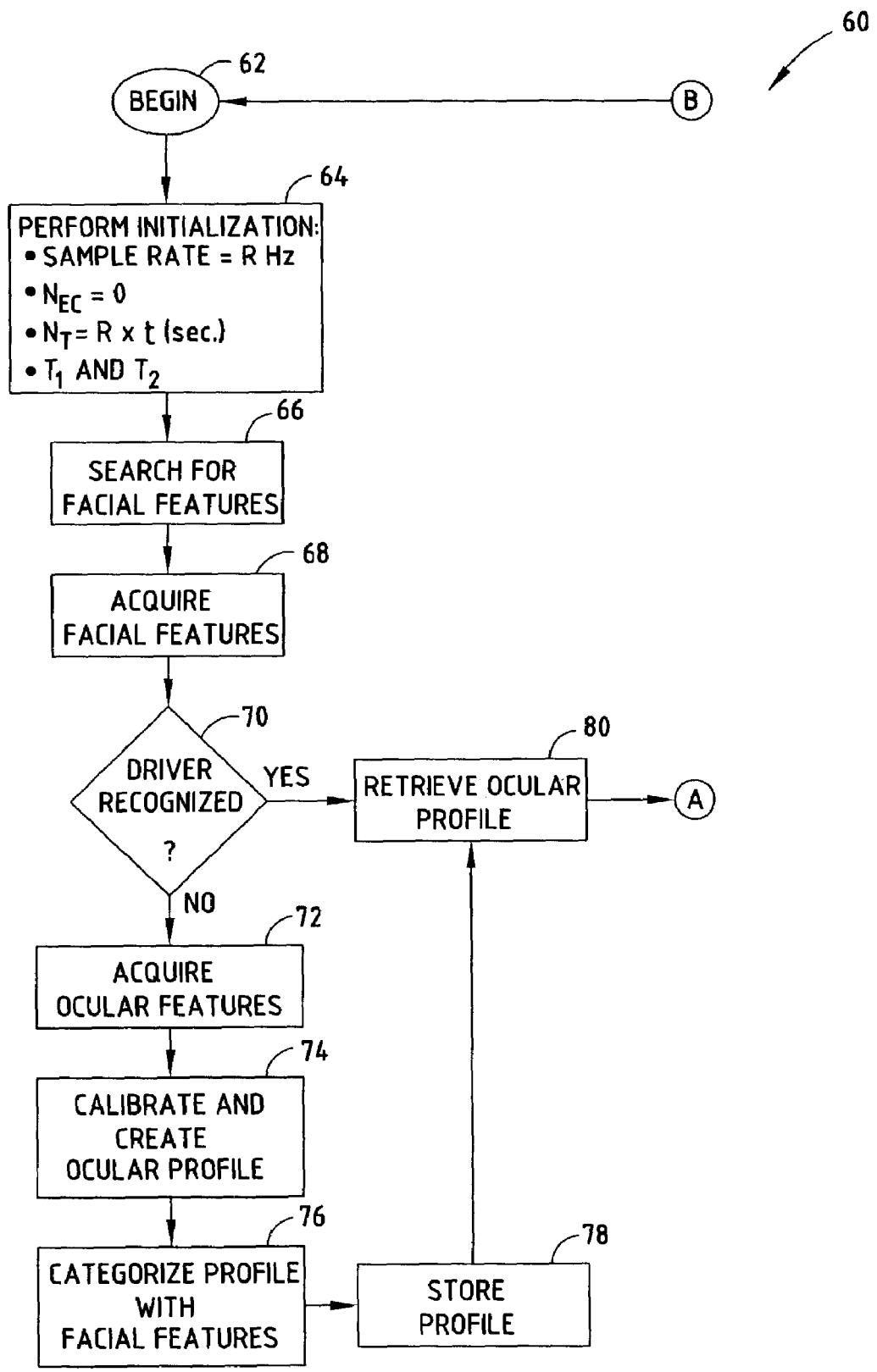
FIGS. 6A and 6B are a flow diagram illustrating a method of detecting driver drowsiness and providing a countermeasure.

Referring now to FIG. 1, the passenger compartment (cockpit) 12 of a vehicle 10 is generally shown equipped with a mono-camera driver drowsiness detector system having a video imaging camera 20 located within the dash 14 and focused on the person (driver) 18 driving the vehicle 10 for generating images of the driver 18. The video imaging camera 20 is shown mounted generally in a mid-region of the dash in the front region of the cockpit 12. The video imaging camera 20 may be mounted in any of a number of various locations within the vehicle 10 which allow for the acquisition of video images of one or both eyes of the driver 18 of the vehicle 10. For example, the video imaging camera 20 may be mounted in the steering assembly 16, or mounted elsewhere in the dash 14, or may be mounted in the instrument cluster as disclosed in U.S. application Ser. No. 10/103,202, filed on Mar. 21, 2002, the entire disclosure of which is hereby incorporated herein by reference. While a single video imaging camera 20 is shown and described herein, it should be appreciated that the driver drowsiness detection system may employ two or more video cameras, without departing from the teachings of the present invention.

The video imaging camera 20 is mounted to the dash 14 such that the camera 20 captures successive video image frames of the region where the driver 18 of the vehicle 10 is expected to be located during normal vehicle driving. More particularly, the video image captures the driver's face including one or both eyes 22 and the surrounding ocular features generally formed in the area referred to as the ocular adnexa. The acquired video images are then processed for tracking one or more facial characteristics of the driver 18. Each video frame image is processed to determine whether one or both eyes 22 of the driver 18 are in an open position or a closed position, and a series of successive video frames are further processed to determine a time proportion of eye closure. The time proportion of eye closure is then used to determine a driver drowsiness condition.

Referring to FIG. 2, the video imaging camera 20 is shown focused on an eye 22 of the driver's face. The video imaging camera 20 is shown focused at an inclination angle θ relative to the horizontal plane of the vehicle 10. The inclination angle θ is within the range of zero to thirty degrees (0° to 30°). An inclination angle θ in the range of zero to thirty degrees (0° to 30°) generally provides a clear view of the driver's ocular features including one or both eyes 22 and the pupil of the eyes 22, the superior and inferior eyelids, and the palpebral fissure space between the eyelids.

A portion of the video image 30 for a given frame is shown in FIG. 3A with the driver's eye 22 in the open position, and is further shown in FIG. 3B with the driver's eye 22 in the closed position. The video image 30 acquired in each video frame is processed so as to determine if the eye 22 is in the open position or closed position. For each video frame, a binary flag may be set to "0" or "1" to indicate if the monitored eye 22 is in the open position or closed position, respectively, or vice versa. By determining a binary state of the eye in either the open position or closed position, the driver drowsiness detection system of the present invention may employ a low cost camera and processor that does not require the determination of a percentage of closure of the eye in each video frame. The closed position of the eye 22 is determined by monitoring the sclera 26 and/or the iris 24 of the eye 22 and determining when at least one of the sclera 26 and iris 24 are not visible in the visual image due to complete covering by the eyelid 28. Thus, the present system does not require an accurate position of the eyelid 28 in order to detect eye closure.

Referring to FIG. 4, the driver drowsiness system is further shown having the video imaging camera 20 coupled to a vision processor 32 which, in turn, is coupled to countermeasure systems 50. Video imaging camera 20 may include a CCD/CMOS active-pixel digital image sensor mounted as an individual chip onto a circuit board. One example of a CMOS active-pixel digital image sensor is Model No. PB-0330, commercially available from Photobit, which has a resolution of 640 H×480 V. It should be appreciated that other cameras, including less costly and less sophisticated video cameras, may be employed.

The vision processor 32 is shown having a frame grabber 34 for receiving the video frames generated by the video imaging camera 20. Vision processor 32 also includes a video processor 36 for processing the video frames. The processor 32 includes memory 38, such as random access memory (RAM), read-only memory (ROM), and other memory as should be readily apparent to those skilled in the art. The vision processor 32 may be configured to perform one or more routines for identifying and tracking one or more features in the acquired video images, determining an open or closed position of one or both eyes 22 of the driver 18 of the vehicle 10, determining a time proportion of eye closure, and determining a driver drowsiness condition based on the time proportion of eye closure.

Further, the vision processor 32 may output a signal via serial output 40 based on the determination of the driver drowsiness condition so as to initiate action, such as to alert the driver of the drowsy condition and/or to initiate another countermeasures. The signal output via serial output 40 may be supplied via communication bus 44 to one or more of countermeasure systems 50. Countermeasure systems 50 include a visual warning system 52 which may include one or more LED lights, and an auditory warning system 56 which may include an audio message or alarm. The countermeasure systems 50 further include an olfactory alert system 54 which may include delivering a peppermint-scented gas in the vicinity of the driver, and include the heating, ventilation, and air conditioning (HVAC) system 58 which may be controlled to deliver fresh cooler air to the driver, in an attempt to increase driver alertness. Other countermeasure systems may similarly be employed in response to receiving a driver drowsiness condition signal.

Further, the vision processor 32 has a camera control function via control RS-232 logic 42 which allows for control of the video imaging camera 20. Control of the video imaging camera 20 may include automatic adjustment of the pointing orientation of the video imaging camera 20. For example, the video imaging camera 20 may be repositioned to focus on an identifiable feature, and may scan a region in search of an identifiable feature, including the driver's face and, more particularly, one or both eyes 22. Control may also include adjustment of focus and magnification as may be necessary to track an identifiable feature. Thus, the driver drowsiness detection system may automatically locate and track an identifiable feature, such as one or both of the driver's eyes 22.

Referring to FIG. 5, a series of consecutive video image frames 30 are generally shown including video frames $f_i$ through $f_{i-m}$ which are acquired within a time interval, and are used for determining the time proportion of eye closure. Frame $f_i$ is the current frame generated at time i, while $f_{i-1}$ is the frame generated immediately prior thereto, etc. The vision processor 32 determines a binary state of at least one acquired eye 22 of the driver 18 for each frame $f_i$ through $f_{i-m}$ and classifies the position of the eye in each frame $f_i$ through $f_{i-m}$ as either open or closed by setting a binary flag. The total number $N_T$ of frames $f_i$ through $f_{i-m}$ acquired within a predetermined window are then evaluated and compared to the number of frames having a closed eye, which number is referred to as $N_{EC}$. The time proportion of eye closure $P_T$ is determined as the ratio of the number $N_{EC}$ divided by the number $N_T$. The time proportion of eye closure $P_T$ is calculated as a running average, based on all frames acquired within the time interval containing the number $N_T$ of frames $f_i$ through $f_{i-m}$. For example, if the time interval is one minute and the video frame rate is thirty hertz (thirty cycles/second), the total number of frames $N_T$ will be equal to thirty (30) cycles/second×sixty (60) seconds which equals 1,800 frames.

Figure 6B:
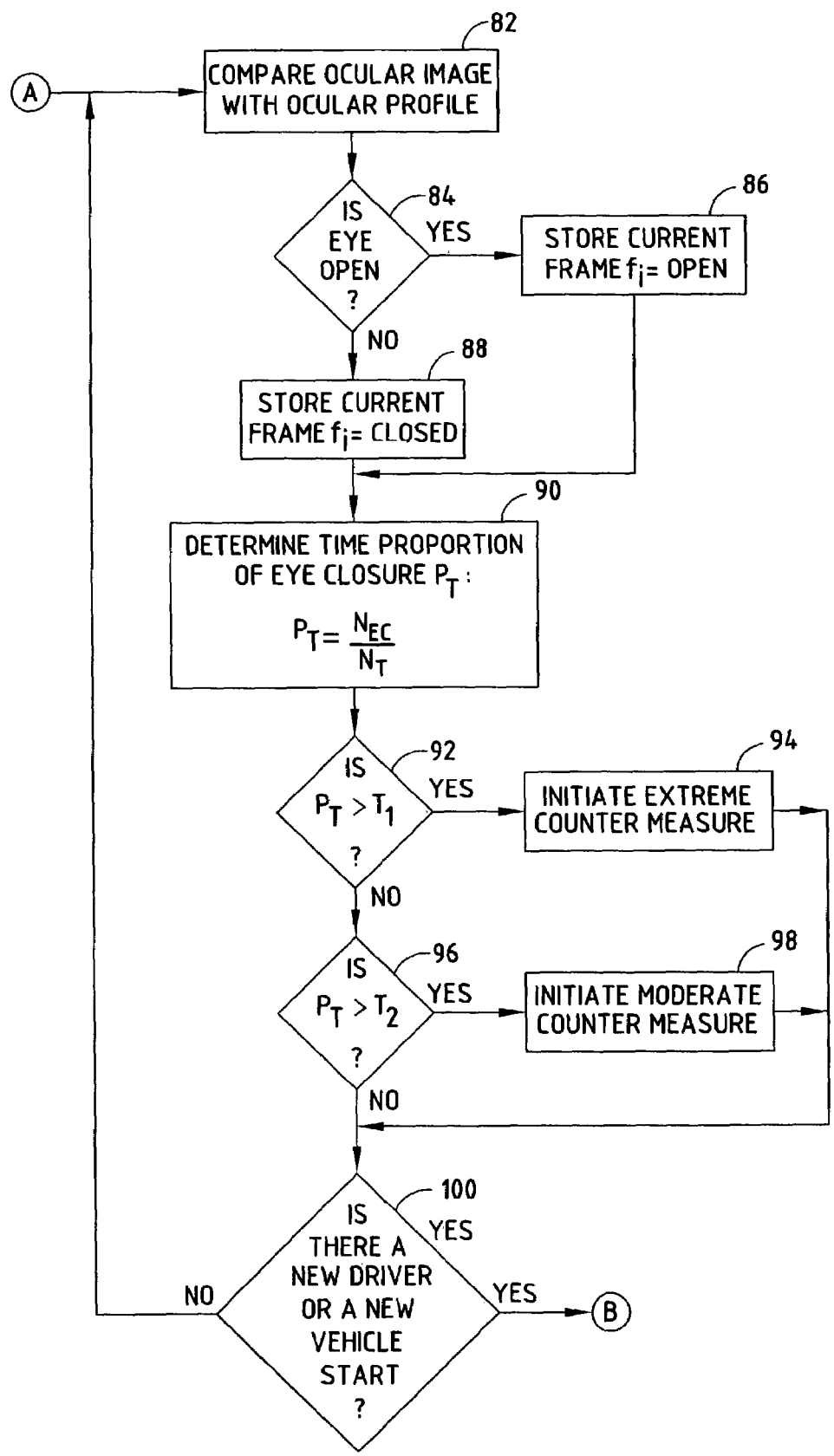

Referring to FIG. 6, a driver drowsy detection routine 60 is illustrated according to one embodiment. The driver drowsy detection routine begins at step 62 and proceeds to perform an initialization routine which includes setting the sample rate equal to R hertz (e.g., 30 hertz), setting the total number of eye closure frames $N_{EC}$ equal to zero, setting the total number of frames $N_T$ equal to R×t seconds, and setting thresholds $T_1$ and $T_2$ to predetermined threshold values.

Following the initialization step 64, driver drowsy detection routine 60 searches the acquired image for facial features in step 66, and acquires the facial features in step 68. In decision step 70, routine 60 determines if the driver has been recognized. If the driver has been recognized, routine 60 proceeds to step 80 to retrieve the ocular profile of the recognized driver. If the driver has not been recognized from the acquired facial features, routine 60 will create a new ocular profile in steps 72 through 78. This includes acquiring the ocular features in step 72, calibrating and creating an ocular profile in step 74, categorizing the profile with facial features in step 76, and storing the profile in memory in step 78.

If either the driver has been recognized or a new profile has been stored in memory, the driver drowsy detection routine 60 will retrieve the ocular profile in step 80, and then will compare the ocular image with the ocular profile in step 82. Proceeding to decision step 84, routine 60 will check if the eye is in an open position. If the eye is in an open position, the eye position for the current frame $f_i$ will be stored as open in step 86. This may include setting a flag for frame $f_i$ to the binary value of zero. If the eye is determined not to be open, the eye position for the current frame $f_i$ will be stored as closed in step 88. This may include setting the flat for frame $f_i$ to the binary value of one. Following assigning either an open or closed eye to the current frame $f_i$, routine 60 proceeds to step 90 to determine the time proportion of eye closure $P_T$. The time proportion of eye closure $P_T$ is determined as a ratio of the total number of frames determined to have an eye closed $N_{EC}$ divided by the total number of frames $N_T$, within a predetermined time interval.

Once the time proportion of eye closure $P_T$ has been calculated, routine 60 proceeds to decision step 92 to determine if the time proportion of eye closure $P_T$ exceeds a first threshold $T_1$ and, if so, initiates an extreme countermeasure in step 94. The extreme countermeasure may include activating a visual LED light and/or sounding an audible alarm. If the time proportion of eye closure $P_T$ does not exceed threshold $T_1$, routine 60 determines if the time proportion of eye closure $P_T$ exceeds a second lower threshold $T_2$ and, if so, initiates a moderate countermeasure in step 98. Moderate countermeasures may include activating a visual LED light or requesting fresh cooler air from the HVAC. If neither of thresholds $T_1$ or $T_2$ are exceeded by the time proportion of eye closure $P_T$, or following initiation of either of the extreme or moderate countermeasures in steps 94 and 98, routine 60 proceeds to decision step 100 to determine if there is a new driver or a new vehicle start and, if so, returns to the beginning at step 62. Otherwise, if there is no new driver or new vehicle start, routine 60 proceeds back to step 82 to compare the next ocular image with the ocular profile.

By tracking one or both of the driver's eyes, the driver drowsiness detection routine 60 may determine driver drowsiness based on a time proportion of eye closure. This may be achieved with a low cost system that makes a binary determination of whether the driver's eye is either open or closed. The driver drowsiness detection system of the present invention is robust and reliable, and does not require knowledge of a baseline of eye opening which may vary with lighting and individual eyes as may be required in more sophisticated systems. The determination of the driver drowsiness condition advantageously enables vehicle countermeasure systems to provide a warning alert to the driver, such as to provide a low-level cautionary warning, or a high-level alert warning. Other countermeasure actions such as delivering fresh cooler air from the HVAC system of the vehicle, or delivering peppermint-scented air may be initiated in order to refresh the driver in an attempt to more fully awaken the driver and keep the driver alert.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A system for monitoring an eye of a person and detecting drowsiness of the person, the system comprising:
   a video imaging camera oriented to generate images of an eye of a person; and
   a processor for processing the images generated by the video imaging camera, said processor monitoring the images of the eye and determining whether the eye is in one of an open position and a closed position, wherein the processor determines that the eye is in the closed position when at least one of a sclera and an iris of an eye is not visible in the image, said processor determining a time proportion of eye closure as a number of video image frames that the eye is determined to be in the closed position as compared to the total number of video frames within a time interval and further determining a drowsiness condition when the time proportion of eye closure exceeds a threshold value.

2. The system as defined in claim 1, wherein the system is located in a vehicle for detecting an eye of a driver of the vehicle and determining a drowsiness condition of the driver of the vehicle.

3. The system as defined in claim 1, wherein the time proportion of eye closure is calculated as a running average based on a fixed number of video frames within the time interval.

4. The system as defined in claim 1, wherein the processor generates an output signal when the processor determines that the time proportion of eye closure exceeds the threshold value.

5. A system for detecting driver drowsiness in a vehicle, said system comprising:
   a video imaging camera located in the vehicle and oriented to generate a sequence of video image frames showing images of an eye of a driver of the vehicle; and
   a processor for processing the images generated by the video imaging camera, said processor monitoring images of the eye and determining whether the eye is in one of an open position and a closed position, wherein the processor determines that the eye is in the closed position when at least one of a sclera and an iris of an eye is not visible in the image, said processor determining a time proportion of eye closure as the proportion of a number of video image frames that the eye is determined to be in the closed position as compared to the total number of video frames within a time interval, and further determining a driver drowsiness condition when the time proportion of eye closure exceeds a threshold value.

6. The system as defined in claim 5, wherein the processor generates an output signal to initiate a countermeasure when the processor determines that the time proportion exceeds the threshold value.

7. The system as defined in claim 6, wherein the countermeasure comprises an alarm warning to the driver.

8. The system as defined in claim 6, wherein the countermeasure comprises a change in one of heating and cooling in the vehicle.

9. The system as defined in claim 5, wherein the time proportion of eye closure is calculated as a running average based on a fixed number of video frames within the time interval.

10. A method for monitoring an eye of a person and detecting a drowsiness condition of the person, said method comprising the steps of:
 generating a sequence of video image frames showing images of an eye of a person with a video imaging camera;
 processing the images of the eye;
 determining whether the eye is one of an open position and a closed position for each image, wherein the processor determines that the eye is in the closed position when at least one of a sclera and an iris of an eye is not visible in the image;
 determining a time proportion of eye closure as a number of video image frames that the eye is determined to be in the closed position as compared to the total number of video frames within a time interval; and
 determining a drowsiness condition of the person when the time proportion of eye closure exceeds a threshold value.

11. The method as defined in claim 10, wherein the method monitors an eye of a driver of a vehicle and detects a drowsiness condition of the driver of the vehicle.

12. The method as defined in claim 10 further comprising the step of generating an output signal to initiate a countermeasure when the determined time proportion of eye closure exceeds the threshold value.

13. The method as defined in claim 12, wherein the countermeasure comprises an alarm warning to the driver.

14. The method as defined in claim 12, wherein the countermeasure comprises a change in one of heating and cooling.

15. The method as defined in claim 10, further comprising the step of calculating a running average of the time proportion of eye closure based on a fixed number of video frames within the time interval.

16. A method for detecting driver drowsiness in a vehicle, said method comprising the steps of:
 capturing a sequence of video image frames with a video imaging camera, each frame showing an image of a driver of the vehicle;
 processing the images acquired to monitor an eye of the driver;
 determining whether the monitored eye is in one of an open position and a closed position, wherein the processor determines that the eye is in the closed position when at least one of a sclera and an iris of an eye is not visible in the image;
 determining a time proportion of eye closure as a number of video image frames that the eye is determined to be in the closed position as compared to the total number of video frames within a time interval; and
 determining a driver drowsiness condition when the time proportion of eye closure exceeds a threshold value.

17. The method as defined in claim 16 further comprising the step of generating an output signal to initiate a countermeasure when the determined time proportion of eye closure exceeds the threshold value.

18. The method as defined in claim 17, wherein the countermeasure comprises an alarm warning to the driver.

19. The method as defined in claim 17, wherein the countermeasure comprises a change in one of heating and cooling in the vehicle.

20. The method as defined in claim 16, further comprising the step of calculating a running average of the time proportion of eye closure based on a fixed number of video frames within the time interval.

* * * * *